US008719034B2

(12) United States Patent
Cross, Jr. et al.

(10) Patent No.: US 8,719,034 B2
(45) Date of Patent: May 6, 2014

(54) DISPLAYING SPEECH COMMAND INPUT STATE INFORMATION IN A MULTIMODAL BROWSER

(75) Inventors: Charles W. Cross, Jr., Wellington, FL (US); Michael Charles Hollinger, Memphis, TN (US); Igor R. Jablokov, Charlotte, NC (US); Benjamin D. Lewis, Ann Arbor, MI (US); Hilary A. Pike, Austin, TX (US); Daniel M. Smith, Raleigh, NC (US); David W. Wintermute, Boynton Beach, FL (US); Michael A. Zaitzeff, Carson City, NV (US)

(73) Assignee: Nuance Communications, Inc., Burlington, MA (US)

( * ) Notice: Subject to any disclaimer, the term of this patent is extended or adjusted under 35 U.S.C. 154(b) by 1531 days.

(21) Appl. No.: 11/154,897

(22) Filed: Sep. 13, 2005

(65) Prior Publication Data

US 2007/0061148 A1  Mar. 15, 2007

(51) Int. Cl.
*G10L 15/08* (2006.01)
*G10L 15/22* (2006.01)
*G10L 15/06* (2013.01)

(52) U.S. Cl.
USPC ......... 704/275; 704/270; 704/270.1; 704/271

(58) Field of Classification Search
USPC ............... 704/275, 270, 270.1, 271, E15.04
See application file for complete search history.

(56) References Cited

U.S. PATENT DOCUMENTS

| 5,450,525 A * | 9/1995 | Russell et al. ........... 704/275 |
| 5,584,052 A * | 12/1996 | Gulau et al. ............ 455/79 |
| 5,812,977 A * | 9/1998 | Douglas ............... 704/275 |
| 5,819,225 A * | 10/1998 | Eastwood et al. ......... 704/275 |
| 5,920,841 A * | 7/1999 | Schottmuller et al. ...... 704/275 |
| 5,995,933 A * | 11/1999 | Fado et al. ............ 704/270 |
| 6,009,397 A * | 12/1999 | Siegel ................ 704/270 |
| 6,075,534 A * | 6/2000 | VanBuskirk et al. ....... 704/275 |
| 6,208,972 B1 * | 3/2001 | Grant et al. ............ 704/275 |
| 6,243,675 B1 * | 6/2001 | Ito ................... 704/232 |
| 6,401,065 B1 * | 6/2002 | Kanevsky et al. ....... 704/256.4 |

(Continued)

FOREIGN PATENT DOCUMENTS

GB  0507148.5  4/2005

OTHER PUBLICATIONS

U.S. Appl. No. 10/924,520, filed Aug. 24 2004, Charles W. Cross.

(Continued)

*Primary Examiner* — Pierre-Louis Desir
*Assistant Examiner* — Abdelali Serrou
(74) *Attorney, Agent, or Firm* — Wolf, Greenfield & Sacks, P.C.

(57) ABSTRACT

Methods, systems, and products are disclosed for displaying speech command input state information in a multimodal browser including displaying an icon representing a speech command type and displaying an icon representing the input state of the speech command. In typical embodiments, the icon representing a speech command type and the icon representing the input state of the speech command also includes attributes of a single icon. Typical embodiments include accepting from a user a speech command of the speech command type, changing the input state of the speech command, and displaying another icon representing the changed input state of the speech command. Typical embodiments also include displaying the text of the speech command in association with the icon representing the speech command type.

17 Claims, 7 Drawing Sheets

(56) References Cited

U.S. PATENT DOCUMENTS

| | | | |
|---|---|---|---|
| 6,532,447 B1* | 3/2003 | Christensson | 704/275 |
| 6,606,599 B2* | 8/2003 | Grant et al. | 704/275 |
| 6,742,021 B1* | 5/2004 | Halverson et al. | 709/218 |
| 6,889,191 B2* | 5/2005 | Rodriguez et al. | 704/275 |
| 6,937,984 B1* | 8/2005 | Morgan et al. | 704/270 |
| 7,003,457 B2* | 2/2006 | Halonen et al. | 704/275 |
| 7,035,805 B1* | 4/2006 | Miller | 704/275 |
| 7,036,128 B1* | 4/2006 | Julia et al. | 719/317 |
| 7,076,429 B2* | 7/2006 | Basson et al. | 704/272 |
| 7,188,067 B2* | 3/2007 | Grant et al. | 704/275 |
| 7,206,747 B1* | 4/2007 | Morgan et al. | 704/275 |
| 7,398,236 B2* | 7/2008 | Jaffe | 705/35 |
| 2001/0047263 A1* | 11/2001 | Smith et al. | 704/275 |
| 2002/0133246 A1* | 9/2002 | Kim et al. | 700/94 |
| 2004/0153323 A1 | 8/2004 | Charney et al. | |
| 2004/0260562 A1* | 12/2004 | Kujirai | 704/275 |
| 2005/0075884 A1* | 4/2005 | Badt | 704/275 |
| 2010/0180202 A1* | 7/2010 | Del Valle Lopez | 715/728 |

OTHER PUBLICATIONS

U.S. Appl. No. 10/945,112, filed Sep. 20, 2004, Charles W. Cross.
U.S. Appl. No. 10/870,517, filed Jun. 17, 2004, Charles W. Cross.
U.S. Appl. No. 10/441,839, filed May 20, 2003, Soonthom Ativanichayaphong.
U.S. Appl. No. 11/062,731, filed Feb. 22, 2005, David Jaramillo.
U.S. Appl. No. 11/007,830, filed Dec. 8, 2004, Charles W. Cross.
U.S. Appl. No. 10/945,119, filed Sep. 20, 2004, Charles W. Cross.
U.S. Appl. No. 11/022,464, filed Dec. 22, 2004, Charles W. Cross.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross.
U.S. Appl. No. 10/849,642, filed May 19, 2004, Charles W. Cross.
U.S. Appl. No. 10/992,979, filed Nov. 19, 2004, Charles W. Cross.
U.S. Appl. No. 10/733,810, filed Dec. 11, 2003, Charles W. Cross.

* cited by examiner

DISPLAYING SPEECH COMMAND INPUT STATE INFORMATION IN A MULTIMODAL BROWSER

BACKGROUND OF THE INVENTION

1. Field of the Invention

The field of the invention is data processing, or, more specifically, methods, systems, and products for displaying speech command input state information in a multimodal browser.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Multimodal devices that support such multimodal access combine multiple user input modes or channels in the same interaction allowing a user to interact with applications on the device simultaneously through multiple input modes or channels. The methods of input include speech recognition, keyboard, touch screen, stylus, mouse, handwriting, and others. Multimodal input often makes using a small device easier.

A multimodal application is an application capable of receiving multimodal input and interacting with users through multimodal output. Such multimodal applications typically support multimodal interaction through hierarchical menus that may be speech driven. Such speech driven menus have a grammar that is subdivided to provide a limited grammar at each tier of the hierarchical menu. Such subdivided limited grammars are assigned to a particular tier in the hierarchical menu that corresponds to the menu choices presented to a user at that tier. A user may navigate each tier of the menu by invoking speech commands in the limited subdivided grammars of that tier that correspond to the menu choices before the user. Only the limited grammars corresponding to the user's current menu choices are typically enabled and therefore available as speech commands for the user. An application will not accept as a speech command an utterance that does not contain words in the currently enabled grammar.

In order to empower a user to properly use speech commands, information describing a currently enabled grammar should be communicated to the user so that the user may make an informed word choice in invoking speech commands. Conventional multimodal web pages convey information describing the current enabled grammar by displaying through text or speech a text file that contains the actual words of the grammar. That is, such web pages simply display the actual words or phrases of the grammar. As multimodal devices become smaller, there is less and less screen space available for displaying the contents of the grammar.

It is not only important to communicate the contents grammar to the user, but it is also important to communicate the input state of a particular speech command. The input state of the speech command describes the current status of a multimodal application with regard to the particular speech command. Input states of speech commands include for example, 'listening' indicating the multimodal application is currently accepting from the user a particular kind of speech command; 'inactive' indicating that the multimodal application is not currently accepting from the user a particular kind of speech command; 'filled' indicating the multimodal application has already accepted from the user a particular speech command and others that will occur to those of skill in the art. It would be helpful to users of multimodal applications if there were a method of displaying speech command input state information to a user that adequately provided the user information concerning the kind of words contained in an active grammar and adequately provided the user with information describing input state of speech commands.

SUMMARY OF THE INVENTION

Methods, systems, and products are disclosed, for displaying speech command input state information in a multimodal browser including displaying an icon representing a speech command type and displaying an icon representing an input state of the speech command. In typical embodiments, the icon representing a speech command type and the icon representing the input state of the speech command also includes attributes of a single icon.

Typical embodiments include accepting from a user a speech command of the speech command type, changing the input state of the speech command, and displaying another icon representing the changed input state of the speech command. Typical embodiments also include displaying the text of the speech command in association with the icon representing the speech command type.

In typical embodiments, accepting from a user a speech command of the speech command type also includes identifying the speech command type in dependence upon the input state of the speech command of the speech command type. In typical embodiments, accepting from a user a speech command of the speech command type also includes receiving from the user a speech command and determining the speech command type of the speech command.

In typical embodiments, determining the speech command type of the speech command also includes determining whether the speech command matches an entry in one of a plurality of grammars for one of a plurality of speech command types and identifying the speech command type in dependence upon a grammar type if the speech command matches an entry in one of a plurality of grammars.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for displaying speech command input state information in a multimodal browser. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Displaying Speech Command Input State Information in a Multimodal Browser

Figure 1:
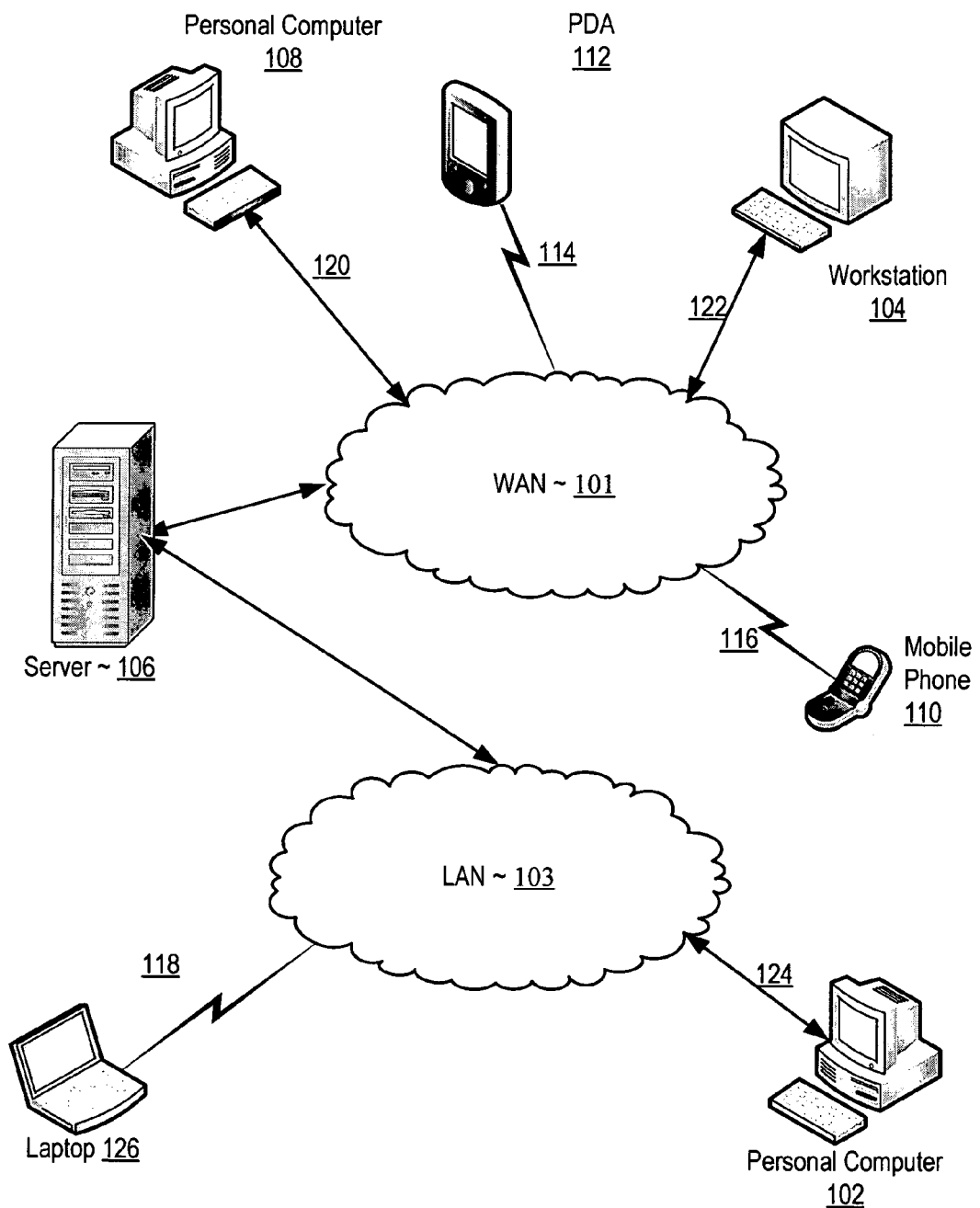
FIG. 1 sets forth a network diagram illustrating an exemplary system of devices each of which is capable of supporting a multimodal application such as a multimodal browser.

Exemplary methods, systems, and products for displaying speech command input state information in a multimodal browser according to embodiments of the present invention are described with reference to the accompanying drawings, beginning with FIG. 1. FIG. 1 sets forth a network diagram illustrating an exemplary system of devices each of which is capable of supporting a multimodal application such as a multimodal browser that is capable of displaying speech command input state information according to embodiments of the present invention. The system of FIG. 1 includes a number of computers connected for data communications in networks. Each of the computers of the system of FIG. 1 may have a multimodal application such as a multimodal browser installed upon it.

The data processing system of FIG. 1 includes wide area network ("WAN") (101) and local area network ("LAN") (103). The network connection aspect of the architecture of FIG. 1 is only for explanation, not for limitation. In fact, systems having multimodal applications according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, server (106) implements a gateway, router, or bridge between LAN (103) and WAN (101). Server (106) may be any computer capable of accepting a request for a resource from a client device and responding by providing a resource to the requester. One example of such a server is an HTTP ('HyperText Transport Protocol') server or 'web server.' The exemplary server (106) is capable of serving up multimodal web pages that are capable of being displayed through a multimodal application such as a multimodal browser. The exemplary server (106) of FIG. 1 is also capable of supporting a multimodal web application capable of creating multimodal web pages that display speech command input state information by displaying an icon representing a speech command type and displaying an icon representing an input state of the speech command.

A speech command type is a predesignated kind of speech command. Such a kind of speech command is often associated with a particular grammar. Such grammars are assigned to a particular menu field designed to receive speech commands of a particular type, to a hierarchical multimodal menu that is navigated with speech commands a particular type, or to other aspects of a multimodal application as will occur to those of skill in the art. For example, speech commands for time may be parsed against a grammar for time that includes keywords words such as '8 o'clock,' 'morning,' 'evening,' 'a.m.,' 'midnight,' and so on as will occur to those of skill in the art. Other examples of speech command types include 'country speech commands,' 'geographic location speech commands,' 'quantity speech commands.'

An icon representing a speech command type is typically a GUI display icon that when displayed conveys to the user an indication of the kind of speech commands a particular application will accept. An icon representing a speech command type may be as simple as text describing the speech command type such as for example the phrase 'Time of Day' or may be an icon designed to convey to a user the speech command type such as a clock representing the time of day.

The input state of the speech command describes the current status of a multimodal application with regard to the particular speech command. States receipt of speech commands include for example, 'listening' indicating the multimodal application is currently accepting from the user a speech command of the speech command type; 'inactive' indicating that the multimodal application is not currently accepting from the user a speech command of the speech command type; 'filled' indicating the multimodal application has already accepted from the user a speech command of the speech command type; and so on as will occur to those of skill in the art.

An icon representing the input state of the speech command is typically a GUI display icon that conveys to the user the current input state of a particular speech command type. An icon representing the input state of the speech command may simply be text describing the input state of a speech command type such as for example the phrase 'Currently Listening for the Time of Day' or may be a separate icon designed to convey to user an input state of the speech command such as a check mark indicating that the speech command was accepted, or the icon may be an attribute of a single icon that represents both the input state of the speech command and the speech command type. A colored clock, for example, may represent both a speech command type for time and the input state of the speech command. The clock may represent the speech command type for time of day and the color of the clock may represent the input state of the speech command. A green clock, continuing with the same example, may be useful as an icon that represents that an application is currently listing for a speech command for time of day.

The exemplary client devices of FIG. 1 (108, 112, 104, 110, 126, and 102) support multimodal applications such as a multimodal browser capable of data communications with a multimodal web application on the server (106) capable of serving up multimodal web pages according to embodiments of the present invention. A 'multimodal browser,' as the term is used in this specification, generally means a web browser capable of receiving multimodal input and interacting with users with multimodal output. Multimodal browsers typically render web pages written in XHTML+Voice (X+V). X+V provides a markup language that enables users to interact with applications through spoken dialog in addition to traditional means of input such as keyboard strokes and mouse pointer action. X+V adds spoken interaction to standard web content by integrating XHTML (eXtensible Hypertext Markup Language) and speech recognition vocabularies supported by Voice XML. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In the example of FIG. 1, several exemplary devices including a PDA (112), a computer workstation (104), a mobile phone (110), and a personal computer (108) are connected to a WAN (101). Network-enabled mobile phone (110) connects to the WAN (101) through a wireless link (116), and the PDA (112) connects to the network (101) through a wireless link (114). In the example of FIG. 1, the personal computer (108) connects through a wireline connection (120) to the WAN (101) and the computer workstation (104) connects through a wireline connection (122) to the WAN (101). In the example of FIG. 1, the laptop (126) connects through a wireless link (118) to the LAN (103) and the personal computer (102) connects through a wireline connection (124) to LAN (103). In the system of FIG. 1, exemplary client devices (108, 112, 104, 110, 126, and 102) support multimodal applications, such multimodal browsers, capable of data communications with a multimodal web application on the server (106).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Multimodal applications that support displaying speech command input state information according to embodiments of the present invention are generally implemented with computers, that is, with automated computing machinery. For further explanation, therefore, FIG. 2 sets forth a block diagram of automated computing machinery comprising an exemplary server (151) capable of serving up multimodal web pages that display speech command input state information through an icon representing a speech command type and an icon representing the input state of the speech command.

Figure 2:
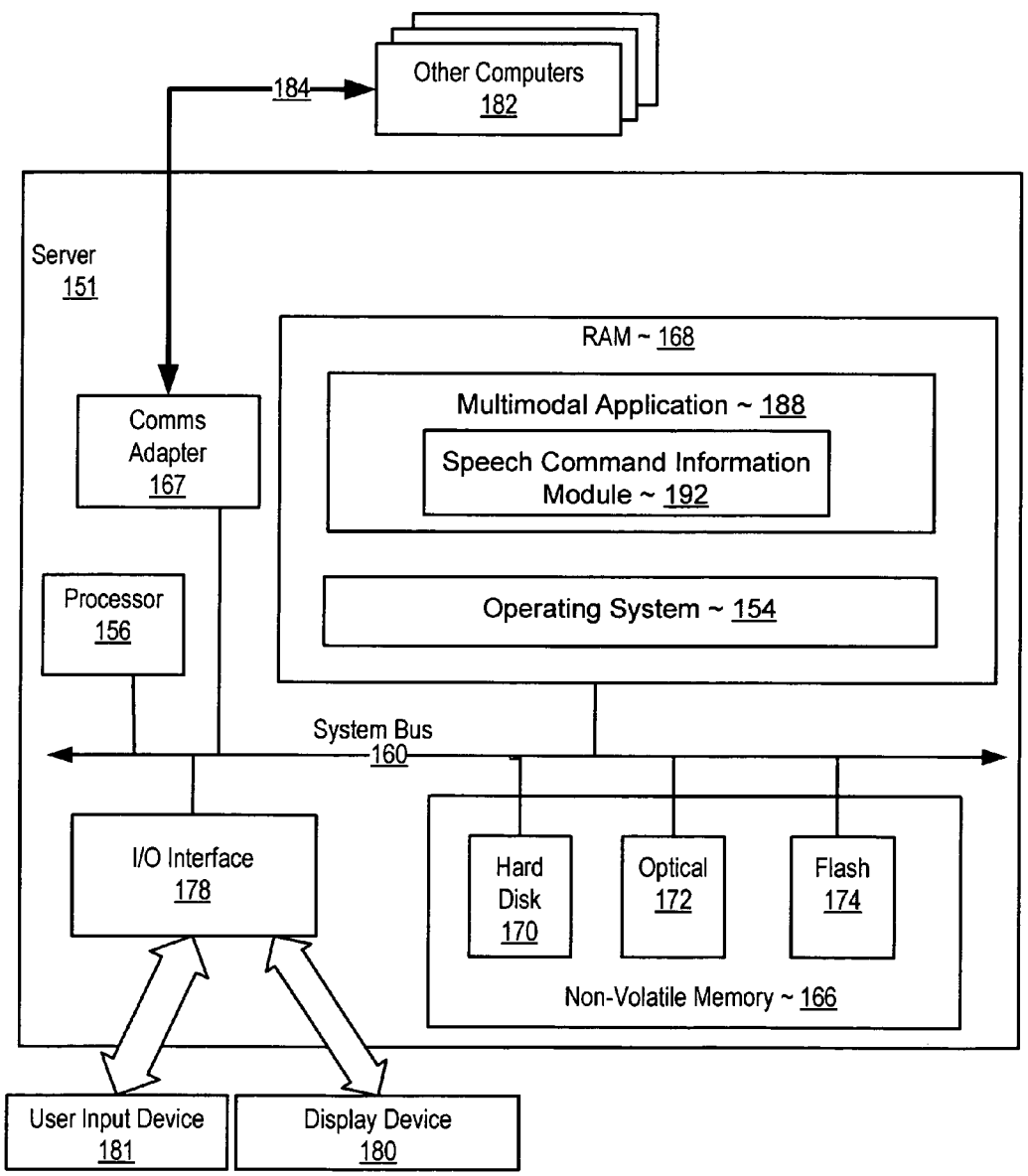
FIG. 2 sets forth a block diagram of automated computing machinery comprising an exemplary server capable of serving up multimodal web pages.

The server (151) of FIG. 2 includes at least one computer processor (156) or 'CPU' as well as random access memory (168) ("μM") which is connected through a system bus (160) to processor (156) and to other components of the computer.

Stored in RAM (168) is an operating system (154). Operating systems useful in computers according to embodiments of the present invention include UNIX™, Linux™, Microsoft NT™, AIX™, IBM's i5/OS, and many others as will occur to those of skill in the art.

Also stored in RAM (168) is a multimodal application (188) having a speech command information module (192) capable generally of creating multimodal web pages for display by a multimodal browser. Such web pages display speech command input state information by displaying an icon representing a speech command type and displaying an icon representing the input state of the speech command. The icon representing a speech command type and the icon representing the input state of the speech command are often implemented as a single icon having attributes that covey both the speech command type and the input state of the speech command.

Server (151) of FIG. 2 includes non-volatile computer memory (166) coupled through a system bus (160) to processor (156) and to other components of the server (151). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary server (151) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary server (151) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal applications according to embodiments of the present invention include modems for wired dial-up communications, Ethernet (IEEE 802.3) adapters for wired network communications, and 802.11b adapters for wireless network communications.

Displaying speech command input state information to a user is often carried out in a multimodal browser running on a client computer. For further explanation, therefore, FIG. 3 sets forth a block diagram of automated computing machinery comprising an exemplary client (152) capable of supporting a multimodal browser capable of displaying speech command input state information by displaying an icon representing a speech command type and displaying an icon representing the input state of the speech command. The icon representing a speech command type and the icon representing the input state of the speech command are often implemented as a single icon.

Figure 3:
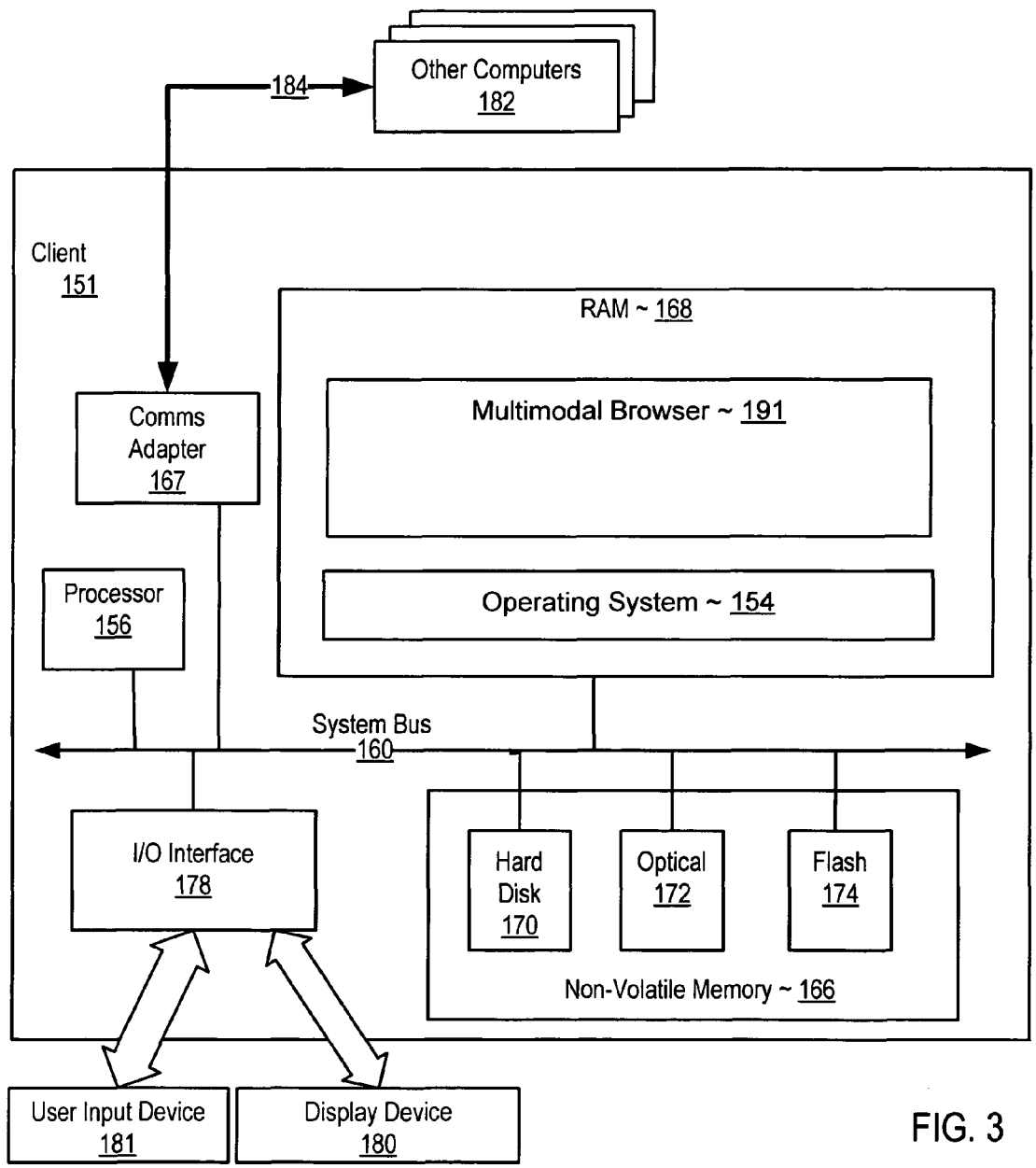
FIG. 3 sets forth a block diagram of automated computing machinery comprising an exemplary client capable of supporting a multimodal browser.

The client (152) of FIG. 3 includes at least one computer processor (156) or 'CPU' as well as random access memory (168) ("RAM") which is connected through a system bus (160) to processor (156) and to other components of the computer. Stored in RAM (168) is an operating system (154). Operating systems useful in computers according to embodiments of the present invention include UNIX™, Linux™, Microsoft NT™, AIX™, IBM's i5/OS, and many others as will occur to those of skill in the art.

Also stored in RAM (168) is a multimodal browser (191) capable of displaying speech command input state information by displaying an icon representing a speech command type and displaying an icon representing the input state of the speech command. The icon representing a speech command type and the icon representing the input state of the speech command are often implemented as a single icon.

Client (152) of FIG. 3 includes non-volatile computer memory (166) coupled through a system bus (160) to processor (156) and to other components of the client (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary client of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary client (152) of FIG. 3 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal browsers according to embodiments of the present invention include modems for wired dial-up communications, Ethernet (IEEE 802.3) adapters for wired network communications, and 802.11b adapters for wireless network communications.

Figure 4:
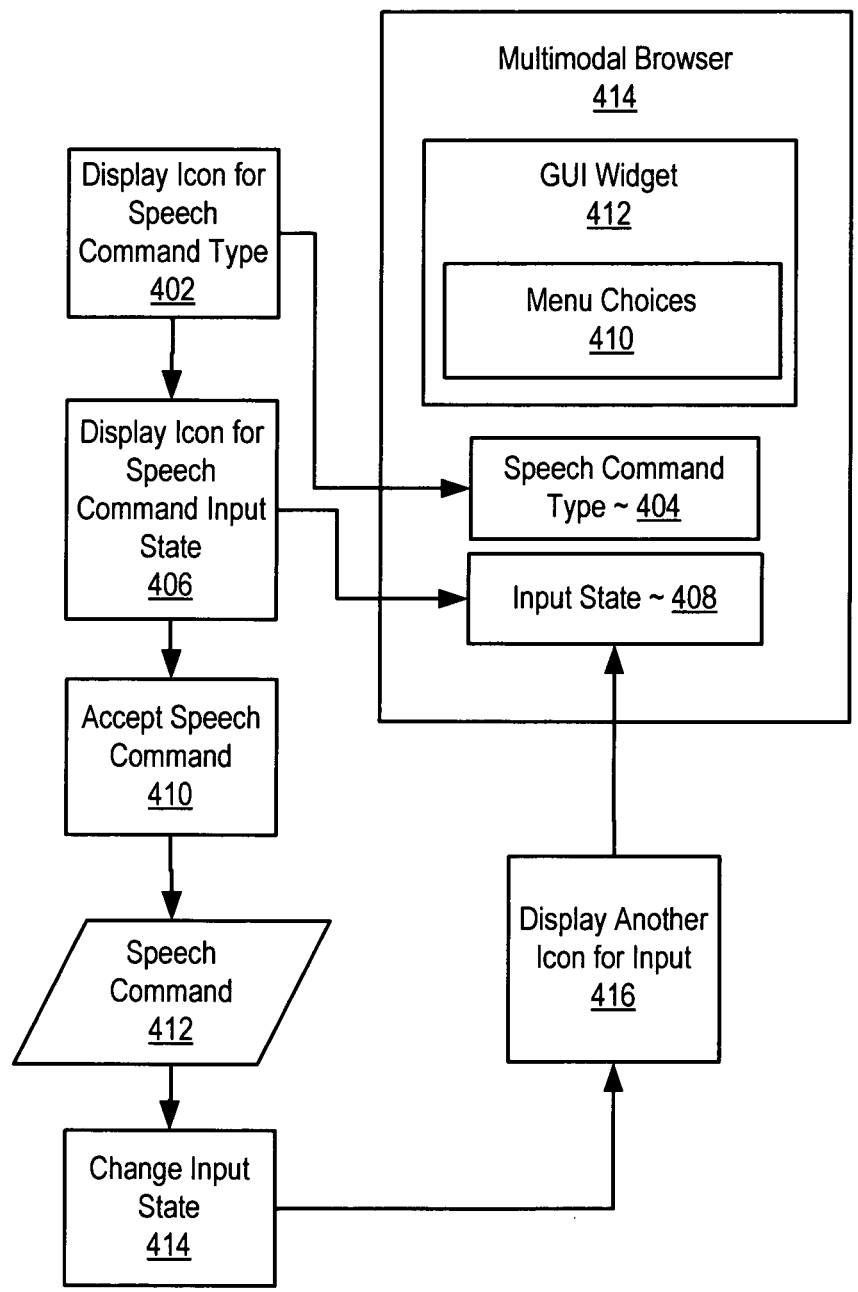
FIG. 4 sets forth a flow chart illustrating an exemplary method for displaying speech command input state information in a multimodal browser.

For further explanation, FIG. 4 sets forth a flow chart illustrating an exemplary method for displaying speech command input state information in a multimodal browser (414). Displaying speech command input state information advantageously notifies the user of the input state of a user's interaction with a multimodal application. That is, displaying speech command input state information allows a user to make an informed word choice in invoking speech commands.

The method of FIG. 4 includes displaying (402) an icon (404) representing a speech command type. A speech command type is a predesignated kind of speech command. Such a kind of speech command is often associated with a particular grammar. Such grammars are assigned to a particular menu field designed to receive speech commands of a particular type, to a hierarchical multimodal menu that is navigated with speech commands a particular type, or to other aspects of a multimodal application as will occur to those of skill in the art. For example, speech commands for time may be parsed against a grammar for time that includes keywords words such as '8 o'clock,' 'morning,' 'evening,' 'a.m.,' 'midnight,' and so on as will occur to those of skill in the art. Other examples of speech command types include 'country speech commands,' 'geographic location speech commands,' 'quantity speech commands.'

An icon (404) representing a speech command type is typically a GUI display icon that when displayed conveys to the user an indication of the kind of speech commands a particular application will accept. An icon representing a speech command type may be as simple as text describing the speech command type such as for example the phrase 'Time of Day' or may be an icon designed to convey to a user the speech command type such as a clock representing the time of day.

The method of FIG. 4 also includes displaying (406) an icon (408) representing the input state of the speech command. The input state of the speech command describes the current status of a multimodal application with regard to the particular speech command. Input states of speech commands include, for example, 'listening' indicating the multimodal application is currently accepting from the user a speech command of the speech command type; 'inactive' indicating that the multimodal application is not currently accepting from the user a speech command of the speech command type; 'filled' indicating the multimodal application has already accepted from the user a speech command of the speech command type; and so on as will occur to those of skill in the art.

An icon (408) representing the input state of the speech command is typically a GUI display icon that conveys to the user the current input state of a particular speech command type. An icon representing the input state of a speech command may simply be text describing the input state of a speech command type such as for example the phrase 'Currently Listening for the Time of Day' or may be an separate icon designed to convey to user an input state of the speech command such as a check mark indicating that the speech command was accepted and so on as will occur to those of skill in the art.

Although the example of FIG. 4 illustrates the icon (404) representing a speech command type of a speech command and the icon (408) representing the input state of the speech command as two distinct icons, this is for explanation and not for limitation. In fact, an icon representing a speech command type and an icon representing the input state of the speech command are often implemented as attributes of a single icon. The single icon having attributes that indicate to a user both the speech command type of the speech command and input state of the speech command. A colored clock, for example, may represent both a speech command type for time and the input state of the speech command. The clock may represent the speech command type for time of day and the color of the clock may represent the input state of the speech command. A green clock, continuing with the same example, may be useful as an icon that represents that an application is currently listing for a speech command for time of day.

The method of FIG. 4 also includes accepting (410) from a user a speech command (412) of the speech command type. Accepting (410) from a user a speech command (412) of the speech command type may be carried out by receiving from the user a speech command and determining the speech command type of the speech command as discussed below with reference to FIG. 6. In some embodiments, accepting from a user a speech command of the speech command type may also be carried out by identifying the speech command type in dependence upon the input state of the speech command of the speech command type. That is, in some embodiments, a speech command of a particular type is only accepted if the state of the receipt of that speech command type does not identify that the speech command has already been received or is not to be accepted. In such examples, speech commands of speech command types whose input state does not allow the receipt of such speech commands are ignored.

The method of FIG. 4 also includes changing (414) the input state of the speech command (412) and displaying (416) another icon representing the changed input state of the speech command. Changing (414) the input state of the speech command (412) is typically carried out by changing an entry in a state table designed to track the current input state of a particular speech command. Displaying (416) another icon representing the changed input state of the speech command advantageously notifies the user of the changed input state of the speech command.

Some embodiments may also include displaying the text of the speech command in association with the icon representing the speech command type. Displaying the text of the speech command in association with the icon representing the speech command type advantageously notifies the user of the actual speech command accepted by the multimodal application.

Figure 5:
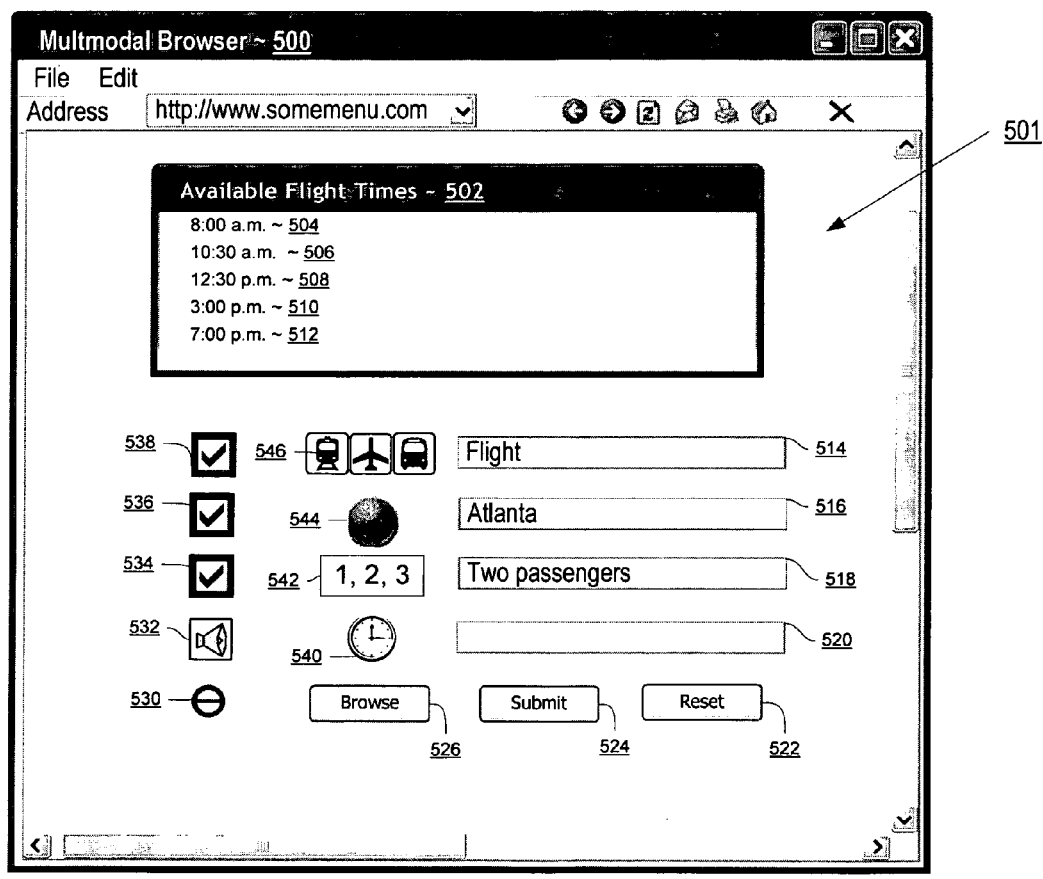
FIG. 5 sets forth a line drawing of a multimodal browser operating in accordance with the method of FIG. 4.

For further explanation, FIG. 5 sets forth a line drawing of a multimodal browser (500) operating in accordance with the method of FIG. 4. The multimodal browser (500) of FIG. 5 is displaying a multimodal web page (501) designed to accept from a user travel information. The exemplary web page (501) has an input widget (514) for receiving from a user a speech command of a speech command type indicating a mode of travel preferred by the user such as flight, a train trip, or a bus trip. An input widget is any GUI widget that accepts inputs. Examples of input widgets include entry fields, a lists, pull-down menus, radio buttons, and so on as will occur to those of skill in the art, The exemplary web page of FIG. 5 also displays an icon (546) representing a speech command type for modes of travel. The exemplary web page of FIG. 5 also displays an icon (538) representing the input state of the travel mode speech command. In the example of FIG. 5, the icon (538) representing the input state of the travel mode speech command is a check mark indicating that a speech command has been accepted. The exemplary web page (501) also displays text describing the speech command in the input widget (514). In this example, a user has selected an airplane flight as the mode of travel and the input widget (514) includes the text 'Flight.'.

The exemplary web page (501) has an input widget (516) for receiving from a user a speech command of a speech command type for a destination city. The exemplary web page of FIG. 5 also displays an icon (544) of a globe representing a speech command type for destination cities. The exemplary web page of FIG. 5 also displays an icon (536) representing the input state of the destination city speech command. In the example of FIG. 5, the icon (536) representing the input state of the destination city speech command is a check mark indicating that a speech command has been accepted. The exemplary web page (501) also displays text describing the speech command in the input widget (516). In this example, a user has selected Atlanta as a destination city and the input widget (516) includes the text 'Atlanta'.

The exemplary web page (501) has an input widget (518) for receiving from a user a speech command of a speech command type for the number of travelers. The exemplary web page of FIG. 5 also displays an icon (542) a speech command type for number that is a display of numbers 1, 2, 3. The exemplary web page of FIG. 5 also displays an icon (534) representing the input state of the number of travelers speech command. In the example of FIG. 5, the icon (534) representing the input state of the number of travelers speech command is a check mark indicating that the speech command has been accepted. The exemplary web page (501) also displays text in the input widget (518) describing the speech command. In this example, a user has selected two passengers as the number of travelers and the input widget includes the text 'Two passengers.'

The exemplary web page (501) has an input widget (520) for receiving from a user a speech command of a speech command type for time of flight. The exemplary web page (501) of FIG. 5 also displays an icon (540) of a clock representing a speech command type for time. The exemplary web page of FIG. 5 also displays an icon (532) representing the input state of the time speech command. In the example of FIG. 5, the icon (532) representing the input state of the time speech command is a speaker indicating that the browser is currently listening and accepting the speech command. The exemplary web page also includes a GUI widget (502) displaying menu choices for flight times. The menu choices include flight times at 8:00 a.m. (504), 10:30 a.m. (506), 12:30 p.m. (508), 3:00 p.m. (510), and 7:00 p.m. (512).

The example of FIG. 5 shows as distinct icons (546, 544, 542, and 540) representing speech command types and icons (538, 536, 534, and 532) representing the input state of the speech commands. Distinct icons for speech command types and icons for input state are for explanation and not for limitation. In fact, a single icon may adequately represent both a specific speech command type and the input state of the speech command. Such single icons typically include at least one attribute representing a specific speech command type and at least one attribute representing a specific input state for a speech command of that speech command type.

Figure 6:
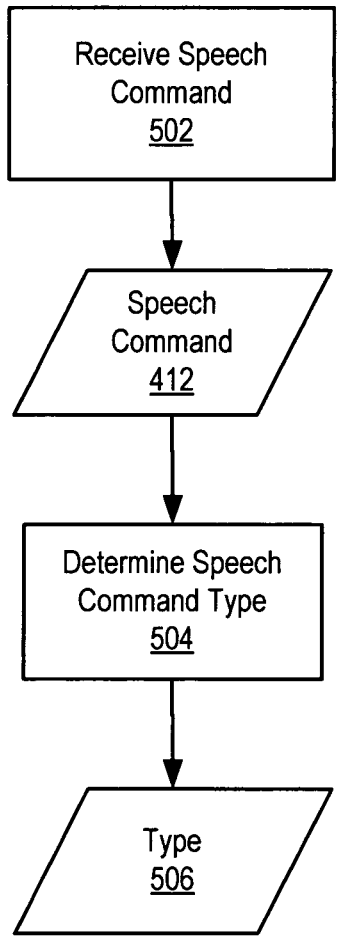
FIG. 6 sets forth a flow chart illustrating an exemplary method for accepting from a user a speech command of the speech command type.

For further explanation, FIG. 6 sets forth a flow chart illustrating an exemplary method for accepting from a user a speech command of the speech command type. The method of FIG. 6 includes receiving (502) from the user a speech command (412). Receiving (502) from the user a speech command (412) typically includes receiving in a multimodal browser speech from a user and parsing the speech against a grammar to identify a speech command. In some examples, parsing the speech against a grammar to identify a speech command may be carried out locally on a client, and in other examples, parsing the speech against a grammar to identify a speech command is carried out by a multimodal web application running on a server coupled for data communications with the client device.

The method of FIG. 6 also includes determining (504) the speech command type (506) of the speech command (412). One way of determining (504) the speech command type (506) is discussed with reference to FIG. 7. For further explanation, FIG. 7 sets forth a flow chart illustrating an exemplary method for determining the speech command type of the speech command that includes determining (606) whether the speech command (412) matches an entry (604) in one of a plurality of grammars (602) for one of a plurality of speech command types. Determining (606) whether the speech command (412) matches an entry (604) in one of a plurality of grammars (602) for one of a plurality of speech command types is carried out by converting the received speech command to text and comparing the converted speech command with a plurality of grammars to determine whether the converted speech matches an entry in one of the grammars. If the speech command (412) does not match an entry (604) in one of a plurality of grammars (602) for one of a plurality of speech command types, then the method of FIG. 7 results in no determination of type (612).

Figure 7:
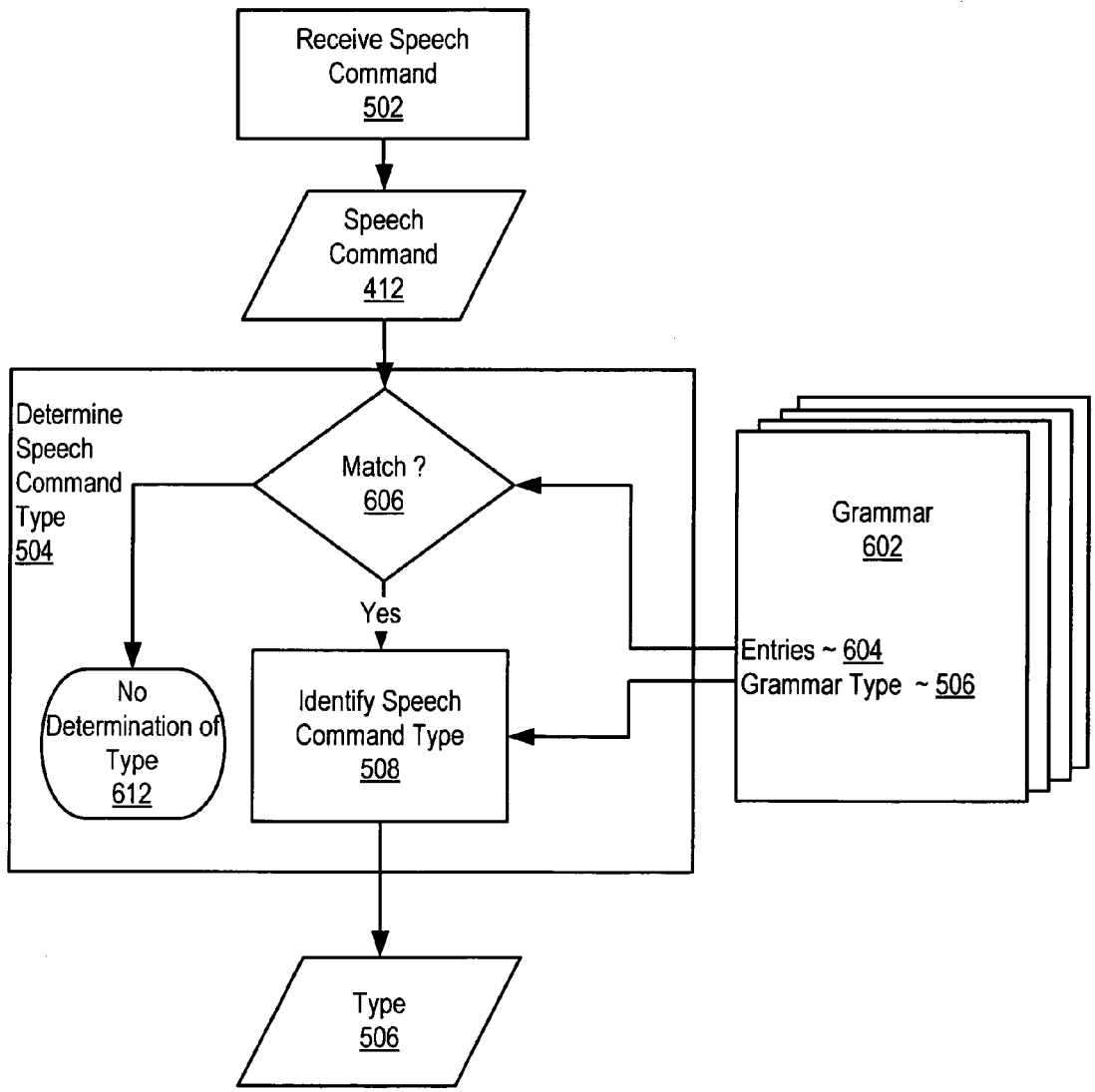
FIG. 7 sets forth a flow chart illustrating an exemplary method for determining the speech command type of the speech command.

The exemplary grammars (602) of FIG. 7 include grammar entries (604). Grammar entries include specific keywords recognized by a speech recognition module of a multimodal application. The exemplary grammars (602) of FIG. 7 also include a grammar type field (506) identifying the kind of grammar. In many embodiments, the grammar type corresponds to a speech command type. That is, the grammars are identified by type such as grammars for time, country designation, geographic location designation, quantity identification and so on as will occur to those of skill in the art.

The method of FIG. 7 also includes identifying (508) the speech command type (506) in dependence upon a grammar type (506) if the speech command (412) matches an entry (604) in one of a plurality of grammars (602). In the example of FIG. 7, the speech command type is determined by identifying a grammar type of a grammar that includes an entry that matches the speech command. In some examples, the speech command types and grammar types have a one-to-one correlation. In such examples, the identified speech command type is the grammar type of the grammar having a matching entry. In other cases, identifying (508) the speech command type (506) in dependence upon a grammar type (506) is carried out in dependence upon speech command identification rules. In such cases, rules designate the identification of a particular a speech command type in dependence upon the type of the grammar having a matching entry.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for displaying speech command input state information for a multimodal application that is configured to accept speech commands of multiple different types, the method comprising:
   displaying on a screen an input widget configured to accept from a user a particular type of speech command included among the multiple different types of speech commands the application is configured to accept, and to display transcribed text of a speech command uttered by the user without having first displayed to the user a set of specific speech commands the input widget is configured to accept;
   displaying on the screen in association with the input widget a text-free icon that indicates the type of speech command the input widget is configured to accept, and input state status of the speech command through an attribute that allows the user to determine the input state status of the speech command; and
   in response to a change in the input state of the speech command, altering the the input state status of the icon so as to allow the user to determine that the input state of the speech command has changed.

2. The method of claim 1, further comprising:
   when the attribute of the icon indicates that the input state of the speech command is in a first state, accepting from the user via the input widget a speech command of the type indicated by the configuration of the icon;
   changing the input state of the speech command from the first state to a second state; and
   altering the attribute of the icon so as to allow the user to determine that the input state of the speech command has changed from the first state to the second state.

3. The method of claim 1, wherein the icon comprises a graphical user interface display icon.

4. The method of claim 1, further comprising displaying in association with the icon text describing the particular type of speech command the input widget is configured to accept.

5. The method of claim 1, wherein the icon comprises a non-word symbol.

6. The method of claim 1, wherein the input widget comprises a first input widget configured to accept from the user a first particular type of speech command included among the multiple different types of speech commands the application is configured to accept, and the icon comprises a first icon that is configured to allow the user to identify the first particular type of speech command the first input widget is configured to accept, and the method further comprises:
   interpreting a first speech command using a first grammar associated with the first type of speech command indicated by the configuration of the first icon;
   displaying on the screen a second input widget configured to accept from the user a second particular type of speech command included among the multiple different types of speech commands the application is configured to accept;
   displaying on the screen in association with the second input widget a second icon, which is different than the first icon, that is configured to allow the user to identify the second particular type of speech command the second input widget is configured to accept; and
   interpreting a second speech command using a second grammar, which is different than the first grammar, associated with the second type of speech command indicated by the configuration of the second icon.

7. The method of claim 6, wherein:
   the first input widget comprises a first menu field configured to accept speech commands of the first type indicated by the configuration of the first icon; and
   the second input widget comprises a second menu field configured to accept speech commands of the second type indicated by the configuration of the second icon.

8. The method of claim 6, wherein the first icon comprises a graphical user interface display icon.

9. The method of claim 6, wherein the first icon is free of text.

10. The method of claim 9, further comprising displaying in association with the first icon text describing the first type of speech command the first input widget is configured to accept.

11. The method of claim 6, wherein the second icon is free of text of specific speech commands the second input widget is configured to accept.

12. The method of claim 6, wherein the first icon comprises a non-word symbol.

13. The method of claim 1, wherein the input widget comprises a first input widget configured to accept from the user a first particular type of speech command included among the multiple different types of speech commands the application is configured to accept, and the icon comprises a first icon comprising a graphical user interface icon that is configured to allow the user to identify the first particular type of speech command the first input widget is configured to accept, and the method further comprises:
   displaying on the screen a second input widget configured to accept from the user a second particular type of speech command included among the multiple different types of speech commands the application is configured to accept; and
   displaying on the screen in association with the second input widget a second icon, which is different than the first icon, that is configured to allow the user to identify the second particular type of speech command the second input widget is configured to accept.

14. The method of claim 1, wherein the input widget comprises a first input widget configured to accept from the user a first particular type of speech command included among the multiple different types of speech commands the application is configured to accept, and to display transcribed text of a first speech command uttered by the user without having first displayed to the user a set of specific speech commands the first input widget is configured to accept, and the icon comprises a first icon configured to allow the user to identify the first particular type of speech command the first input widget is configured to accept, and the method further comprises:

displaying on the screen a second input widget configured to accept from the user a second particular type of speech command included among the multiple different types of speech commands the application is configured to accept, and to display transcribed text of a second speech command uttered by the user without having first displayed to the user a set of specific speech commands the second input widget is configured to accept; and displaying on the screen in association with the second input widget a second icon, which is different than the first icon, that is configured to allow the user to identify the second particular type of speech command the second input widget is configured to accept.

15. The method of claim 14, further comprising displaying in association with the first icon text describing the first type of speech command the first input widget is configured to accept.

16. The method of claim 1, wherein the input widget comprises a first input widget configured to accept from the user a first particular type of speech command included among the multiple different types of speech commands the application is configured to accept, and to display transcribed text of a first speech command uttered by the user without having first displayed to the user a set of specific speech commands the first input widget is configured to accept, and the icon comprises a first icon configured to allow the user to identify the first particular type of speech command the first input widget is configured to accept, and the method further comprises:

displaying on the screen a second input widget configured to accept from the user a second particular type of speech command included among the multiple different types of speech commands the application is configured to accept, and to display transcribed text of a second speech command uttered by the user without having first displayed to the user a set of specific speech commands the second input widget is configured to accept; and displaying on the screen in association with the second input widget a second icon, which is different than the first icon, that is configured to allow the user to identify the second particular type of speech command the second input widget is configured to accept.

17. The method of claim 1, wherein the input widget comprises a first input widget configured to accept from the user a first particular type of speech command included among the multiple different types of speech commands the application is configured to accept, and to display transcribed text of a first speech command uttered by the user without having first displayed to the user a set of specific speech commands the first input widget is configured to accept, and the icon comprises a first icon comprising a non-word symbol that is configured to allow the user to identify the first particular type of speech command the first input widget is configured to accept, and the method further comprises:

displaying on the screen a second input widget configured to accept from the user a second particular type of speech command included among the multiple different types of speech commands the application is configured to accept, and to display transcribed text of a second speech command uttered by the user without having first displayed to the user a set of specific speech commands the second input widget is configured to accept; and displaying on the screen in association with the second input widget a second icon, which is different than the first icon, that is configured to allow the user to identify the second particular type of speech command the second input widget is configured to accept.

\* \* \* \* \*